US009509777B2

United States Patent
Lee et al.

(10) Patent No.: US 9,509,777 B2
(45) Date of Patent: Nov. 29, 2016

(54) CONNECTION METHOD AND MANAGEMENT SERVER

(71) Applicants: Ching-Ming Lee, Taipei (TW); Chi-Bin Li, Taipei (TW)

(72) Inventors: Ching-Ming Lee, Taipei (TW); Chi-Bin Li, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 208 days.

(21) Appl. No.: 14/257,001

(22) Filed: Apr. 21, 2014

(65) Prior Publication Data

US 2014/0324950 A1 Oct. 30, 2014

Related U.S. Application Data

(60) Provisional application No. 61/815,707, filed on Apr. 24, 2013.

(51) Int. Cl.
  *H04L 29/08* (2006.01)
  *H04L 29/06* (2006.01)

(52) U.S. Cl.
  CPC ............ *H04L 67/141* (2013.01); *H04L 65/10* (2013.01); *H04L 65/1066* (2013.01)

(58) Field of Classification Search
  CPC ....... H04L 67/00–67/141; H04L 65/00–65/80
  See application file for complete search history.

(56) References Cited

U.S. PATENT DOCUMENTS

| 2008/0288580 A1* | 11/2008 | Wang | ................ | H04L 29/12509 |
| | | | | 709/203 |
| 2010/0177779 A1* | 7/2010 | Masuda | ............... | H04L 65/1069 |
| | | | | 370/401 |
| 2016/0028831 A1* | 1/2016 | Rantapuska | ............ | H04L 67/16 |
| | | | | 709/228 |

* cited by examiner

*Primary Examiner* — Nicholas Taylor
*Assistant Examiner* — Clayton R Williams
(74) *Attorney, Agent, or Firm* — Jianq Chyun IP Office

(57) ABSTRACT

A connection method and a management server are provided. Each electronic apparatus detects connection behavior supported by a network, where the electronic apparatus is located, through the management server and accordingly generates a corresponding connection profile and stores it to the management server. The management server reads two connection profiles corresponding to two electronic apparatuses when the management server receives a connection request desired to connect from one of the electronic apparatuses to another one, and dynamically adjusts a plurality of connection detection procedures based on a connection success/failure record. The management server tests the connection detection procedures to determine whether a connection can be established between the two electronic apparatuses so as to obtain a session profile for establishing the connection.

20 Claims, 5 Drawing Sheets

CONNECTION METHOD AND MANAGEMENT SERVER

CROSS-REFERENCE TO RELATED APPLICATION

This application claims the priority benefits of U.S. provisional application Ser. No. 61/815,707, filed on Apr. 24, 2013. The entirety of the above-mentioned patent applications is hereby incorporated by reference herein and made a part of this specification.

BACKGROUND OF THE DISCLOSURE

1. Technical Field

The present disclosure generally relates to a communication technique, in particular, to a connection method and a management server.

2. Description of Related Art

As technology and the network infrastructure continue to develop and the number of network users increases, network address translation (NAT) technique is broadly used to solve the problem of lacking network address in Internet Protocol (IP). In the environment with a large amount of user ends making use of private IP addresses (or virtual IP addresses), when the user end located outside of the NAT network environment wants to establish a data transmission connection with the user end inside of the NAT network environment, the request message sent by the user end outside would be blocked and therefore, the user end inside may not know that there is a request for establishing connection and the connection thus failed.

SUMMARY OF THE DISCLOSURE

The present disclosure provides a connection method and a management server, which may test the connection behavior corresponding to each electronic apparatus, and further find the optimal traversal method.

The connection method of the present disclosure includes the following steps: a plurality of electronic apparatuses detect connection behavior separately through a management server, and accordingly generates a corresponding connection profile and stores it to the management server, wherein the connection behavior is supported by a network where the electronic apparatus is located; when the management server receives a connection request desired to connect from a first electronic apparatus of the electronic apparatuses to a second electronic apparatus of the electronic apparatuses, the management server executes the following steps: reading the connection profiles corresponding to the first electronic apparatus and the second electronic apparatus separately; dynamically adjusting a plurality of connection detection procedures based on a connection success/failure record; and examining the connection detection procedures based on the connection profiles to determine whether a connection can be established between the first electronic apparatus and the second electronic apparatus, so as to obtain a session profile for establishing the connection.

In an embodiment of the present disclosure, each electronic apparatus described above further comprises executing the following steps: when connecting to the network where the electronic apparatus is located, determining whether it is a first-time connection of the network; if it's a first-time connection, detecting connection behavior supported by a network where the electronic apparatus is located through a management server.

In an embodiment of the present disclosure, when the foregoing management server receives a connection request desired to connect to the second electronic apparatus, the management server determines whether the session profile for establishing the connection between the first electronic apparatus and the second electronic apparatus exists. If the session profile does not exist, the management server executes the process of dynamically adjusting connection detection procedures based on a connection success/failure record. If the session profile exists, the management server transmits the session profile to the first electronic apparatus and the second electronic apparatus, so as to establish the connection between the two parties.

In an embodiment of the present disclosure, the above step of separately detecting connection behavior of electronic apparatuses through a management server, wherein the connection behavior is supported by a network where the electronic apparatus is located, includes: establishing a notification channel with the management server for transmitting a plurality of connection detection messages to the management server through the notification channel, and receiving a plurality of responding messages from the management server, wherein the above-mentioned responding messages are transmitted separately by the management server corresponding to the connection detection messages; and determining the connection behavior of network nodes located in the network according to the above-mentioned responding messages, wherein the network nodes have the function of NAT.

In an embodiment of the present disclosure, the foregoing network nodes are, for example, routers.

In an embodiment of the present disclosure, the above-mentioned connection detection messages include: at least one or a combination of the messages for detecting the type of a network node, messages for detecting the geographical location or the Internet service provider (ISP) of a network node, messages for detecting whether an electronic apparatus can be connected directly, messages for detecting whether a network node has the capability of port forwarding, messages for detecting whether a network node has the capability of hole punching, messages for detecting whether an electronic apparatus only supports outbound connection and does not have the support of being connected, and messages for detecting the features of a network node.

In an embodiment of the present disclosure, the foregoing connection detection procedures include a direct connection procedure, a port forwarding procedure, a hole punching procedure, and a relay connection procedure.

In an embodiment of the present disclosure, the above-mentioned electronic apparatus is one of notebook computer, desktop computer, smart phone, tablet computer, network attached storage (NAS) or Internet protocol camera (IP camera), which has the function of network communication.

In an embodiment of the present disclosure, the connection method described above further includes: gathering statistics of every connection for each of the electronic apparatus through the management server to obtain the connection success/failure record of each apparatus.

In an embodiment of the present disclosure, an apparatus end agent is configured in each electronic apparatus described above, and a server end agent module and a push notification module are configured in the management server, wherein the push notification module is used such that the electronic apparatus can detect the connection behavior supported by a network where the electronic apparatus is located through the management server, and the electronic apparatus can communicate with the server end agent module of the management server through the apparatus end agent.

In an embodiment of the present disclosure, the foregoing connection method further includes: using each electronic apparatus described above as an apparatus under test one by one, and the apparatus under test detects the features of the network node corresponding to the network where the apparatus under test is located through a feature detecting server in cooperation with the management server. The step described above includes: the apparatus under test determines whether the public IP address of the corresponding network node is the same as the private IP address through the management server; in the case that the public IP address of the network node is not the same as the private IP address, the apparatus under test determines whether the corresponding network node has a port restricted feature or a port changed feature through the feature detecting server.

In an embodiment of the present disclosure, the above-mentioned apparatus under test transmits a first packet to a first port of the management server via an unreliable communication protocol. When the apparatus under test receives, from the notification channel, a response of the management server to the first packet received by the first port, the apparatus under test will compare the private IP address with the public IP address included in the response of the first packet to determine whether the public IP address is the same as the private IP address.

In an embodiment of the present disclosure, in the above-mentioned case that the public IP address of the network node is not the same as the private IP address, when the apparatus under test receives a second packet from a first port of the feature detecting server through a second port of the network node, the apparatus under test determines that the corresponding network node does not have the port restricted feature and the port changed feature, wherein the second packet is transmitted via an unreliable communication protocol. When the apparatus under test does not receive a second packet through the second port of the network node, the apparatus under test transmits a third packet to the first port of the feature detecting server through a third port of the network node via an unreliable communication protocol, wherein the third packet is applied for requesting the feature detecting server to transmit a fourth packet to the third port of the network node that the apparatus under test is corresponding to. When the apparatus under test receives the fourth packet through the third port, the apparatus under test determines whether a fifth packet is received from a fourth port of the feature detecting server. In the case of receiving the fifth packet from the fourth port of the feature detecting server, if the second port is identical to the third port, it is determined that the corresponding network node does not have the port restricted feature and the port changed feature, and if the second port is not identical to the third port, it is determined that the corresponding network node does not have the port restricted feature and has the port changed feature. In the case that the apparatus under test does not receive the fifth packet from the fourth port of the feature detecting server, if the second port is identical to the third port, it is determined that the corresponding network node has the port restricted feature and does not have the port changed feature, and if the second port is not identical to the third port, it is determined that the corresponding network node has the port restricted feature and the port changed feature.

In an embodiment of the present disclosure, the foregoing hole punching procedure in the connection detection procedures includes: determining a connecting order according to whether the respective network nodes of the first electronic apparatus and the second electronic apparatus have the port restricted feature or the port changed feature. Among which, when only a network node of one of the first electronic apparatus and the second electronic apparatus has the port changed feature, the connection is performed from the network node having the port changed feature toward the other network node. When both of the respective network nodes of the first electronic apparatus and the second electronic apparatus have the port changed feature, the connection is performed from the network node without the port restricted feature toward the other network node. When both of the respective network nodes of the first electronic apparatus and the second electronic apparatus have the port changed feature and the port restricted feature, it is determined that the first electronic apparatus and the second electronic apparatus cannot perform the hole punching procedure. When both of the respective network nodes of the first electronic apparatus and the second electronic apparatus do not have the port changed feature, the connection is performed from the network node having the port restricted feature toward the other network node. When both of the respective network nodes of the first electronic apparatus and the second electronic apparatus do not have the port changed feature and the port restricted feature, the connection is performed from any side of the network nodes toward the other network node.

The management server of the present disclosure includes: a transmission unit, a storage unit, and a processing unit, wherein using the transmission unit to communicate with a plurality of electronic apparatuses, and storing the connection profiles corresponding to the above-mentioned electronic apparatuses in the storage unit. The processing unit is coupled to the transmission unit and the storage unit. Among which, the processing unit receives a plurality of connection detection messages from each electronic apparatus, and transmits a plurality of corresponding responding messages to each electronic apparatus, such that each electronic apparatus determines the connection behavior of the network where it is located according to the above-mentioned responding messages, and accordingly generates a corresponding connection profile and stores it to the management server. When the processing unit receives a connection request desired to establish a connection with the second electronic apparatus from the first electronic apparatus through the transmission unit, the processing unit reads the respective connection profiles corresponding to the first electronic apparatus and the second electronic apparatus separately from the storage unit, dynamically adjusts the plurality of connection detection procedures to be executed based on a connection success/failure record, and examines whether the above-mentioned connection detection procedures can establish a connection between the first electronic apparatus and the second electronic apparatus based on the respective connection profiles corresponding to the first electronic apparatus and the second electronic apparatus, so as to obtain a session profile between the first electronic apparatus and the second electronic apparatus.

According to the preceding description, the corresponding connection behavior of each electronic apparatus can be detected through the interactions with the management server, and the connectabililty among the electronic apparatuses can be determined by further subtly using the management server in order to find the optimal traversal method.

The following embodiments are included to provide a further understanding of the above features and advantages of the present disclosure, and accompanying drawings are incorporated in, together with the detailed descriptions as follows.

DESCRIPTION OF THE EMBODIMENTS

To provide a further understanding of the content of the present disclosure, the following embodiments are presented as examples that can be implemented accordingly.

In the following embodiments, a network system includes at least one management server and a plurality of electronic apparatuses. These electronic apparatuses may locate in different networks (such as a public network or a private network) separately, and detects the connection behavior supported by the network where it is located through the management server. When one of the electronic apparatuses wants to perform a connection with another electronic apparatus, the management server may determine a connection mechanism between the two parties according to the connection behavior supported by the network where it is located, and further establish a connection between the two parties in a proper connection method.

Figure 1:
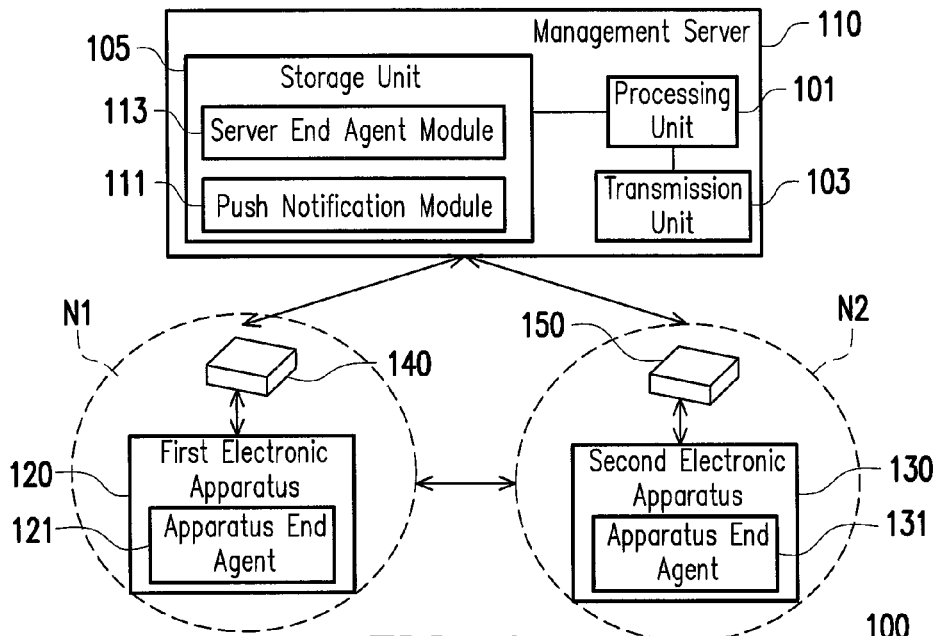
FIG. 1 is a diagram of a network system according to an embodiment of the present disclosure.

FIG. 1 is a diagram of a network system according to an embodiment of the present disclosure. In the present embodiment, two electronic apparatuses are considered for explanation; however, the amount of the electronic apparatuses is not limited in other embodiments. Please refer to FIG. 1, the network system 100 includes a management server 110, a first electronic apparatus 120, and a second electronic apparatus 130. The first electronic apparatus 120 is located in a first network N1 and connected to a first network node 140. The second electronic apparatus 130 is located in a second network N2 and connected to a second network node 150.

Herein, the first electronic apparatus 120 and the second electronic apparatus 130 are respectively, for example, a notebook computer, a desktop computer, a smart phone, a tablet computer, a NAS or an IP camera, which has the function of network communication. The first network node 140 and the second network node 150 have the function of NAT, such as routers.

The management server 110 mainly includes a processing unit 101, a transmission unit 103, and a storage unit 105. The processing unit 101 is coupled to the transmission unit 103 and the storage unit 105. Herein, the processing unit 101 is, for example, a central processing unit (CPU), a microprocessor, a digital signal processor (DSP) or a programmable controller, etc. The transmission unit 103, such as a network card, is applied to communicate with the first electronic apparatus 120, the second electronic apparatus 130, and other electronic apparatuses that are not illustrated. The storage unit 105 is, for example, a solid state disk (SSD), a hard disk drive (HDD) or a flash memory, etc. The storage unit 105 may be used to store the connection profiles of the first electronic apparatus 120, the second electronic apparatus 130, and other electronic apparatuses that are not illustrated.

In addition, a push notification module 111 and a server end agent module 113 (for example, stored in the storage unit 105) are configured in the management server 110. And the apparatus end agents 121 and 131 are configured in the first electronic apparatus 120 and the second electronic apparatus 130 respectively. The management server 110 uses the push notification module 111 such that the first electronic apparatus 120 and the second electronic apparatus 130 may detect the connection behavior supported by the first network N1 and the second network N2 through the management server 110. Furthermore, the first electronic apparatus 120 and the second electronic apparatus 130 perform communications with the server end agent module 113 of the management server 110 though their apparatus end agents 121 and 131 respectively.

To be more specific, the push notification module 111 provides push notification services such that the clients may actively connect to the server end. In other words, the first electronic apparatus 120 and the second electronic apparatus 130 establish notification channels with the push notification module 111 of the management server 110 though their apparatus end agents 121 and 131 respectively. By way of the notification channels, the first electronic apparatus 120 and the second electronic apparatus 130 may transmit a plurality of connection detection messages to the management server 110, receive a plurality of responding messages from the management server 110, and further determine the connection behavior of the first network node 140 and the second network node 150 respectively according to the received responding messages.

Figure 2:
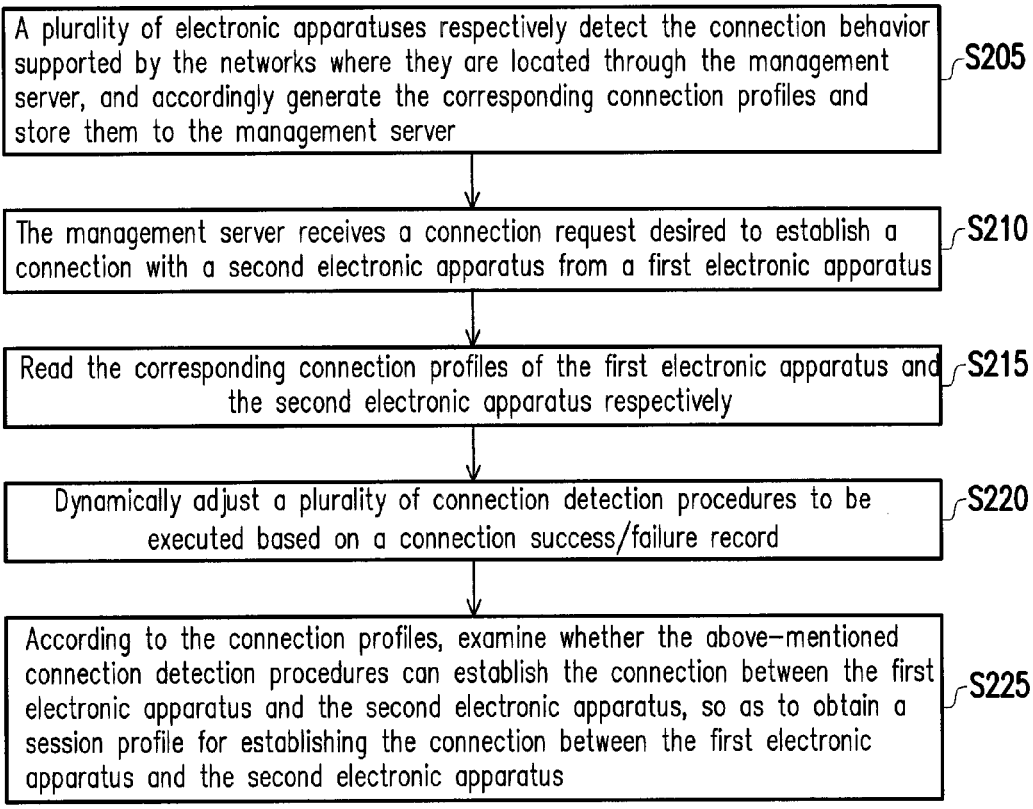
FIG. 2 is a flowchart of a connection method according to an embodiment of the present disclosure.

The following in conjunction with the foregoing network system 100 provides an explanation for the connection method between the two electronic apparatuses. FIG. 2 is a flowchart of a connection method according to an embodiment of the present disclosure. Please refer to FIG. 1 and FIG. 2, the first electronic apparatus 120 and the second electronic apparatus 130 respectively detect the connection behavior supported by the first network N1 and the second network N2 where they are located through the management server 110, and accordingly generate the corresponding connection profiles and store them to the management server 110 (step S205).

The following takes the first electronic apparatus 120 as an example, and the second electronic apparatus 130 can be derived in a similar way. The first electronic apparatus 120 establishes a notification channel through the apparatus end agent 121 and the push notification module 111 of the management server 110, so as to transmit a plurality of connection detection messages to the server end agent module 113 of the management server 110 through the notification channel. After the server end agent module 113 of the management server 110 receives the connection detection messages, it may transmit the corresponding responding messages to the first electronic apparatus 120 through the notification channel. The first electronic apparatus 120 may receive a plurality of responding messages from the management server 110 through the apparatus end agents 121, determine the connection behavior of the first network node 140 in the first network N1 where it is located based on these responding messages, and generate the corresponding connection profile according to the obtained connection behavior and transmit it to the management server 110 for storage.

The above-mentioned connection detection messages include: at least one or a combination of the messages for detecting the type of a network node, messages for detecting the geographical location or the ISP of a network node, messages for detecting whether an electronic apparatus can be connected directly, messages for detecting whether a network node has the capability of port forwarding, messages for detecting whether a network node has the capability of hole punching, messages for detecting whether an electronic apparatus only supports outbound connection and does not have the support of being connected, and messages for detecting the features of a network node.

Figure 3:
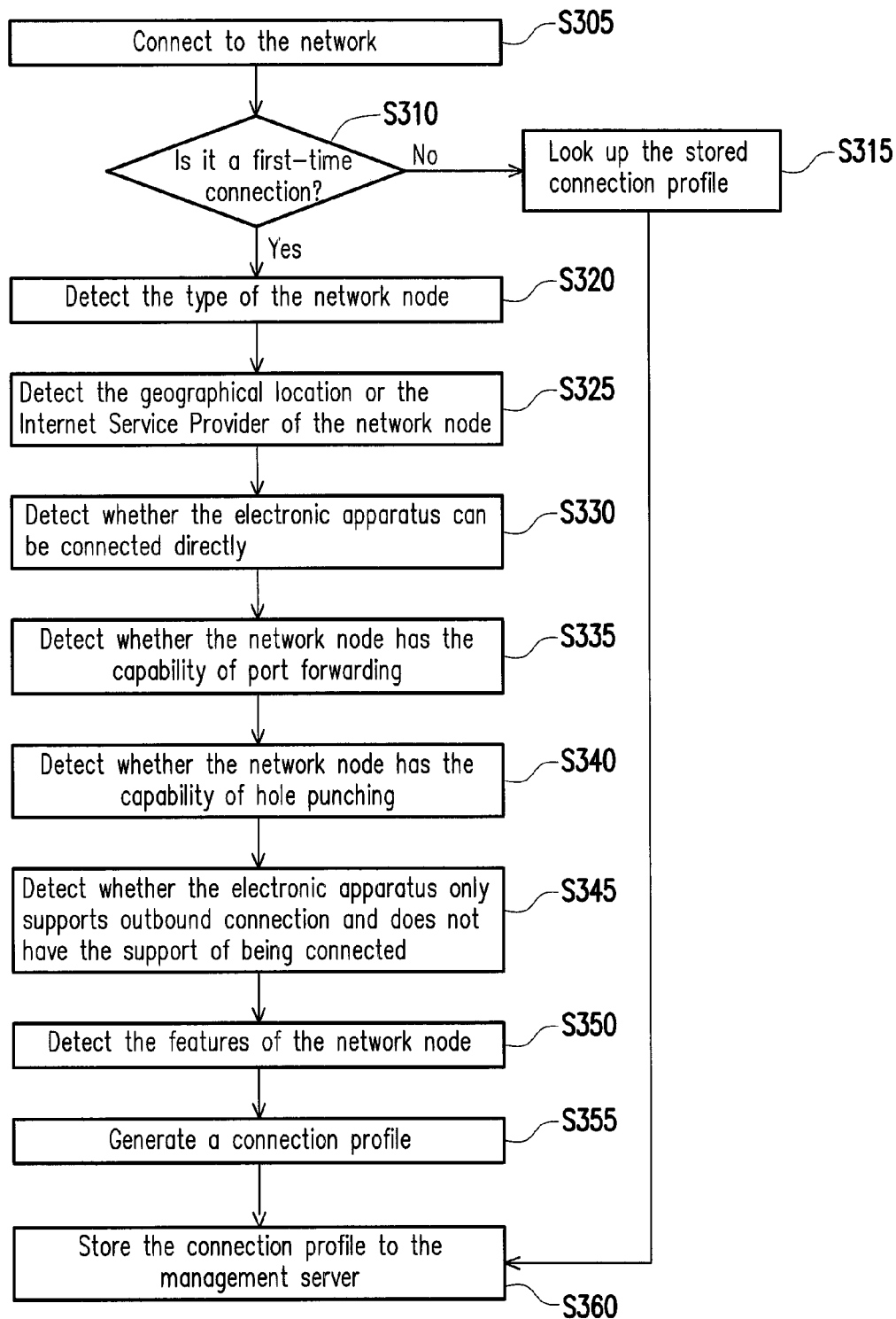
FIG. 3 is a flowchart of detecting connection behavior according to an embodiment of the present disclosure.

For example, FIG. 3 is a flowchart of detecting connection behavior according to an embodiment of the present disclosure. Please refer to FIG. 1 and FIG. 3 simultaneously, the following takes the first electronic apparatus 120 as an example, and the second electronic apparatus 130 can be derived in a similar way. The first electronic apparatus 120 connects to the first network node 140 and so connects to the first network N1 (step S305). Then, the first electronic apparatus 120 determines whether it is a first-time connection of the first network N1 (step S310). For example, the first electronic apparatus 120 may store the service set identifier (SSID) of the first network node 140 and/or the media access control address (MAC address). Accordingly, the first electronic apparatus 120 may determine whether it is the first-time connection to the first network node 140 by using the stored SSID and MAC address.

If it is not the first-time connection to the first network N1, the first electronic apparatus 120 may look up the connection profile stored within directly (step S315), and then, store the connection profile to the management server 110 (step S360). If it is the first-time connection to the first network N1, then the first electronic apparatus 120 may establish a notification channel with the push notification module 111 of the management server 110 through the apparatus end agent 121, and then the apparatus end agent 121 and the server end agent module 113 may transmit messages mutually via the notification channel for testing the connection behavior supported by the first network node 140 (such as steps S320-S350).

Testing the connection behavior supported by the first network node 140 include the following steps: detecting the type of the first network node 140 (step S320), and the said type is, for example, the manufacturer of the first network node 140; detecting the geographical location or the ISP of the first network node 140 (step S325), wherein the said geographical location of the first network node 140 is obtained by the public IP address of the first network node 140; detecting whether the first electronic apparatus 120 can be connected directly (step S330); detecting whether the first network node 140 has the capability of port forwarding (step S335); detecting whether the first network node 140 has the capability of hole punching (step S340); detecting whether the first electronic apparatus 120 only supports outbound connection and does not have the support of being connected (step S345); and detecting the features of the first network node 140 (step S350), wherein the said features include the port restricted feature and the port changed feature.

Herein, the order and the combination of steps S320-S350 are only exemplary, and are not limited thereto. After the first electronic apparatus 120 transmits the connection detection messages to the server end agent module 113 of the management server 110 through its apparatus end agent 121 and finished the detection of the connection behavior according on the received responding messages, the first electronic apparatus 120 may generate a connection profile and store this connection profile within (step S355). In addition, the first electronic apparatus 120 may also transmit this connection profile to the management server 110 for storage (step S360).

In addition, before the first electronic apparatus 120 and the second electronic apparatus 130 perform any connections, the operation of detecting the connection behavior in the background can be made via the apparatus end agents 121 and 131 respectively. Accordingly, when one of the first electronic apparatus 120 and the second electronic apparatus 130 wants to perform connection with the other, the subsequent operations can be executed promptly.

And then, referring back to FIG. 2, the management server 110 receives a connection request desired to establish a connection with the second electronic apparatus 130 from the first electronic apparatus 120 (step S210). Afterwards, the management server 110 may read the corresponding connection profiles of the first electronic apparatus 120 and the second electronic apparatus 130 within (step S215).

Then, the management server 110 dynamically adjusts a plurality of connection detection procedures to be executed based on a connection success/failure record (step S220). For example, the management server 110 may gather statistics for every connection of the first electronic apparatus 120 and the second electronic apparatus 130 to obtain the connection success/failure record. For example, the first electronic apparatus 120 and the second electronic apparatus 130 mat report their connection results to the management server 110. Herein, the connection detection procedures include a direct connection procedure, a port forwarding procedure, a hole punching procedure, and a relay connection procedure. The management server 110 may determine to execute which connection detection procedures and the examining order thereof and so forth based on the respective connection success/failure records of the first electronic apparatus 120 and the second electronic apparatus 130.

Afterwards, the management server 110 examines whether the above-mentioned connection detection procedures can establish a connection between the first electronic apparatus 120 and the second electronic apparatus 130 according to the connection profiles of the first electronic apparatus 120 and the second electronic apparatus 130, so as to obtain a session profile for establishing a connection between the first electronic apparatus 120 and the second electronic apparatus 130 (step S225).

The following presents an applied example with explanation, and in the following applied example, routers are taken as the first network node 140 and the second network node 150.

Figure 4:
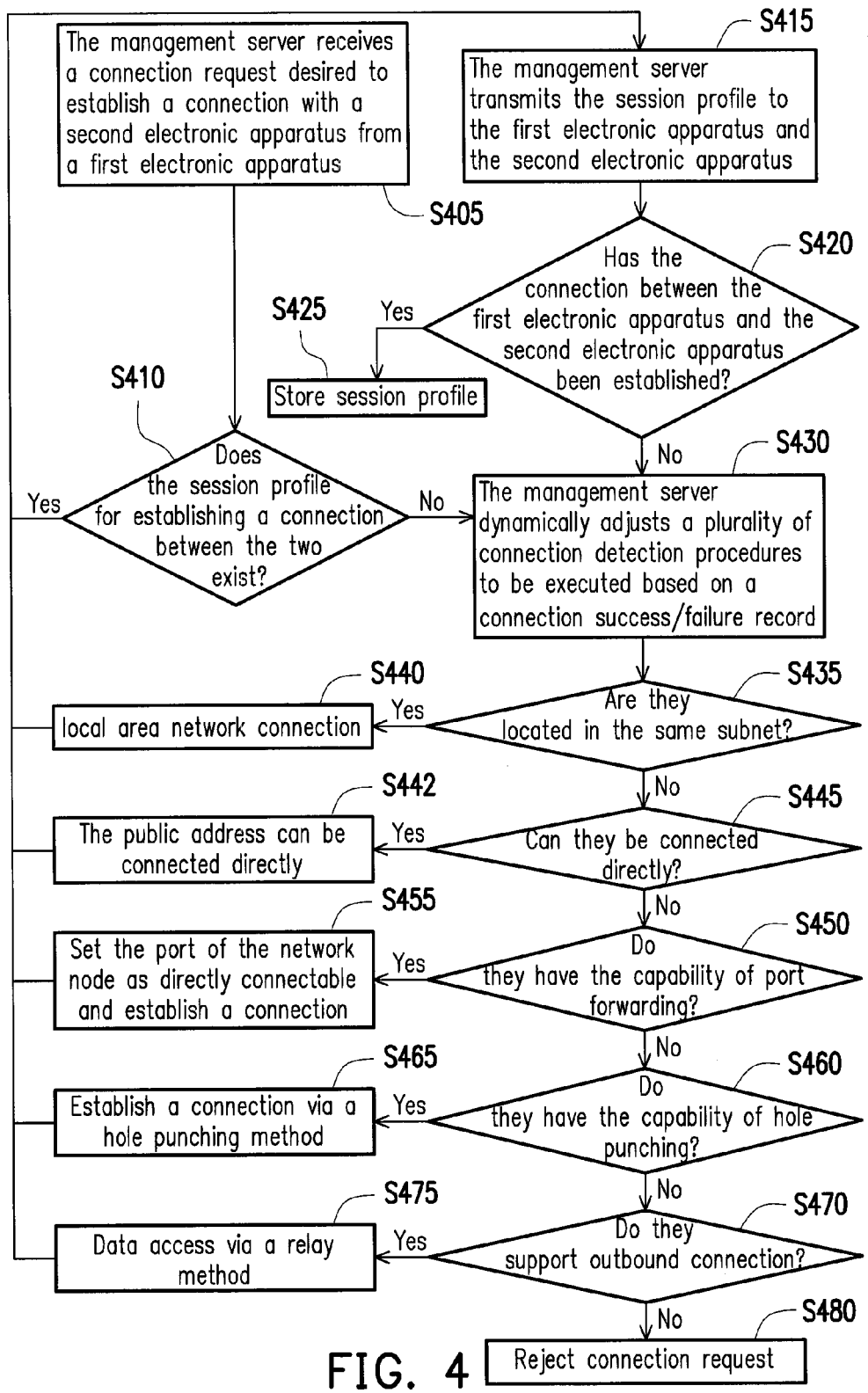
FIG. 4 is a flowchart of another connection method according to an embodiment of the present disclosure.

FIG. 4 is a flowchart of another connection method according to an embodiment of the present disclosure. FIG. 4 is one of the applied examples of FIG. 2. Please refer to FIG. 1 and FIG. 4 simultaneously, the management server 110 receives a connection request desired to establish a connection with the second electronic apparatus 130 from the first electronic apparatus 120 (step S405). And then, the management server 110 checks whether the session profile for establishing a connection between the two parties exists in the storage unit 105 (step S410). If it exists, then the management server 110 transmits the session profile to the first electronic apparatus 120 and the second electronic apparatus 130 (step S415). Afterwards, whether the connection between the first electronic apparatus 120 and the second electronic apparatus 130 has been established is determined (step S420). If the connection has been established, then the session profile is stored to the first electronic apparatus 120, the second electronic apparatus 130, and the management server 110 (step S425).

Besides, if the connection between the first electronic apparatus 120 and the second electronic apparatus 130 has not been established, which represents that the existing session profile has errors or is failed, then the management server 110 dynamically adjusts a plurality of connection detection procedures to be executed based on a connection success/failure record (step S430). Or in the case that the result of checking whether the session profile for establishing a connection between the two parties exists in the management server 110 (step S410) is negative, the management server 110 may also dynamically adjust a plurality of connection detection procedures to be executed based on a connection success/failure record (step S430). The following takes the direct connection procedure, the port forwarding procedure, the hole punching procedure, and the relay connection procedure as examples for explanation, but the types, numbers, and orders of the connection detection procedures are not limited thereto, and the preset connection detection procedures can be modified regarding the conditions. And the management server 110 may also dynamically adjust the types, numbers, and orders of these connection detection procedures based on the connection success/failure record.

For example, the management server 110 determines whether the first electronic apparatus 120 and the second electronic apparatus 130 are located in the same subnet according to their respective connection profiles (step S435). If the two parties are located in the same subnet, then the first electronic apparatus 120 establishes a local area network connection with the second electronic apparatus 130 directly (step S440), and accordingly generates a session profile.

If the first electronic apparatus 120 and the second electronic apparatus 130 are not located in the same subnet, then whether at least one of the routers can be connected directly is determined (step S445). In other words, which one end of the routers of the first electronic apparatus 120 and the second electronic apparatus 130 can be connected directly is determined. If the corresponding router of one of the first electronic apparatus 120 and the second electronic apparatus 130 can be connected directly, then it is decided that the public address of the router can be connected directly (step S442), and accordingly the connection between the two parties can be established. For example, if the router of the first electronic apparatus 120 can be connected directly, then a connection is established from the second electronic apparatus 130 toward the first electronic apparatus 120.

If both routers of the first electronic apparatus 120 and the second electronic apparatus 130 cannot be connected directly, then whether at least one of the routers has the capability of port forwarding is determined (step S450). If positive, it is set that the port of the corresponding router can be connected directly, and accordingly the connection between the two parties can be established (step S455).

If both routers of the first electronic apparatus 120 and the second electronic apparatus 130 do not have the capability of port forwarding, then whether both routers have the capability of hole punching is determined. If positive, a connection is established via a hole punching method (step S465). If negative, which represents that routers of the first electronic apparatus 120 and the second electronic apparatus 130 cannot establish direct connection, then whether both routers support outbound connection is determined (step S470). If positive, the data access of the two parties is performed via a relay method (step S475), for example, data transmission of the two parties is performed with the help of the management server 110. If negative, which represent that the first electronic apparatus 120 and the second electronic apparatus 130 cannot transmit data with the help of the management server 110, and so the connection request is rejected (step S480).

After the management server 110 performs the connection detection procedures (such as steps S440, S442, S455, S465 or S475), the corresponding session profile will be generated and step S415 will be re-executed.

With regard to the above-mentioned hole punching procedure, the connection order of the two sides is determined by the features of the routers (network nodes) such as the port restricted feature and the port changed feature. When only one side has the port changed feature, the connection is performed from the router having the port changed feature toward the other side. When both sides have the port changed feature, the connection is performed from the router without the port restricted feature toward the other side. When both sides have the port changed feature and the port restricted feature, the hole punching procedure cannot be performed, and thus data transmission is performed via a relay method. When both sides do not have the port changed feature, the connection is performed from the router having the port restricted feature toward the other side. When both sides do not have the port changed feature and the port restricted feature, the connection from which side toward the other side is not limited thereto.

Figure 5:
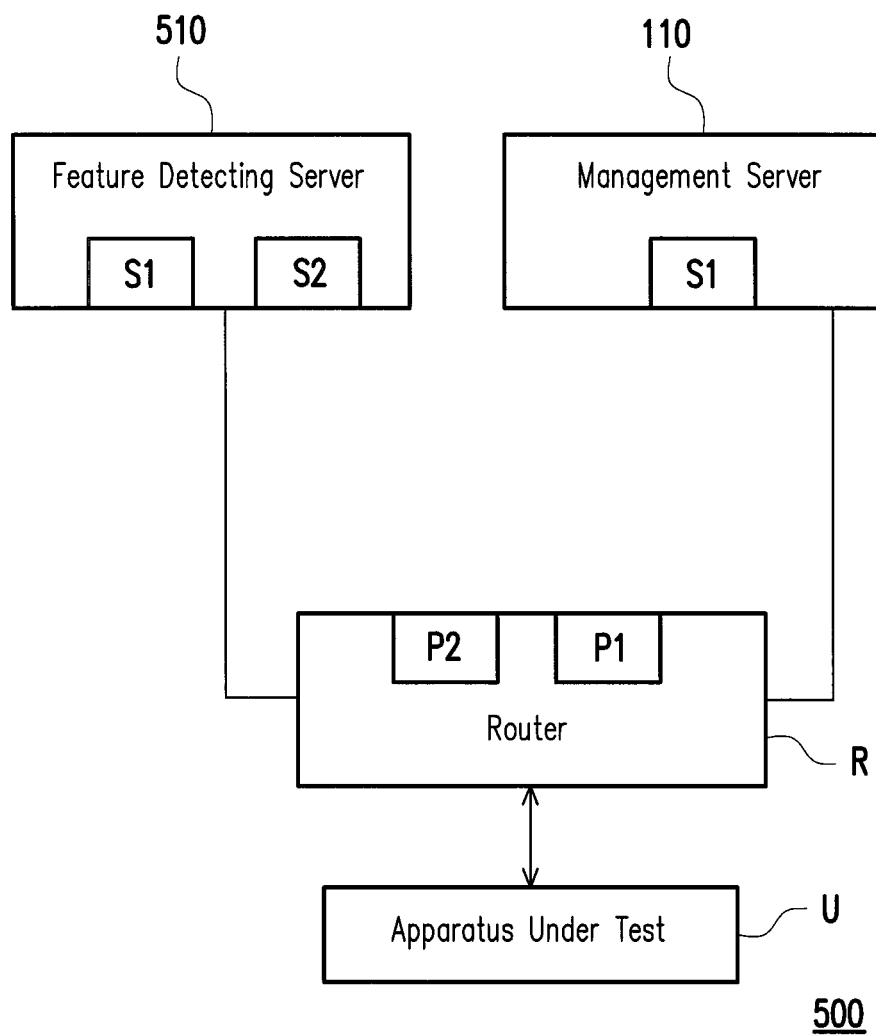
FIG. 5 is a diagram of a network system that may determine the features of a router according to an embodiment of the present disclosure.

The following is another embodiment for explaining how to determine the features of the routers (network nodes). FIG. 5 is a diagram of a network system that may determine the features of a router according to an embodiment of the present disclosure. In FIG. 5, besides a management server 110, the network system 500 further includes a feature detecting server 510. Herein, an apparatus under test U may be any electronic apparatus of the first electronic apparatus 120, the second electronic apparatus 130, and so on, and a router R is taken as the corresponding network node of the apparatus under test U. The apparatus under test U detects the features of the corresponding network node (such as router R) through the feature detecting server 510 in cooperation with the management server 110. The apparatus under test U determines whether the public IP address of the corresponding router R is the same as the private IP address through the management server 110. In the case that the public IP address of the network node is not the same as the private IP address, the apparatus under test U determines whether the router R has the port restricted feature or the port changed feature through the feature detecting server 510.

Figure 6:
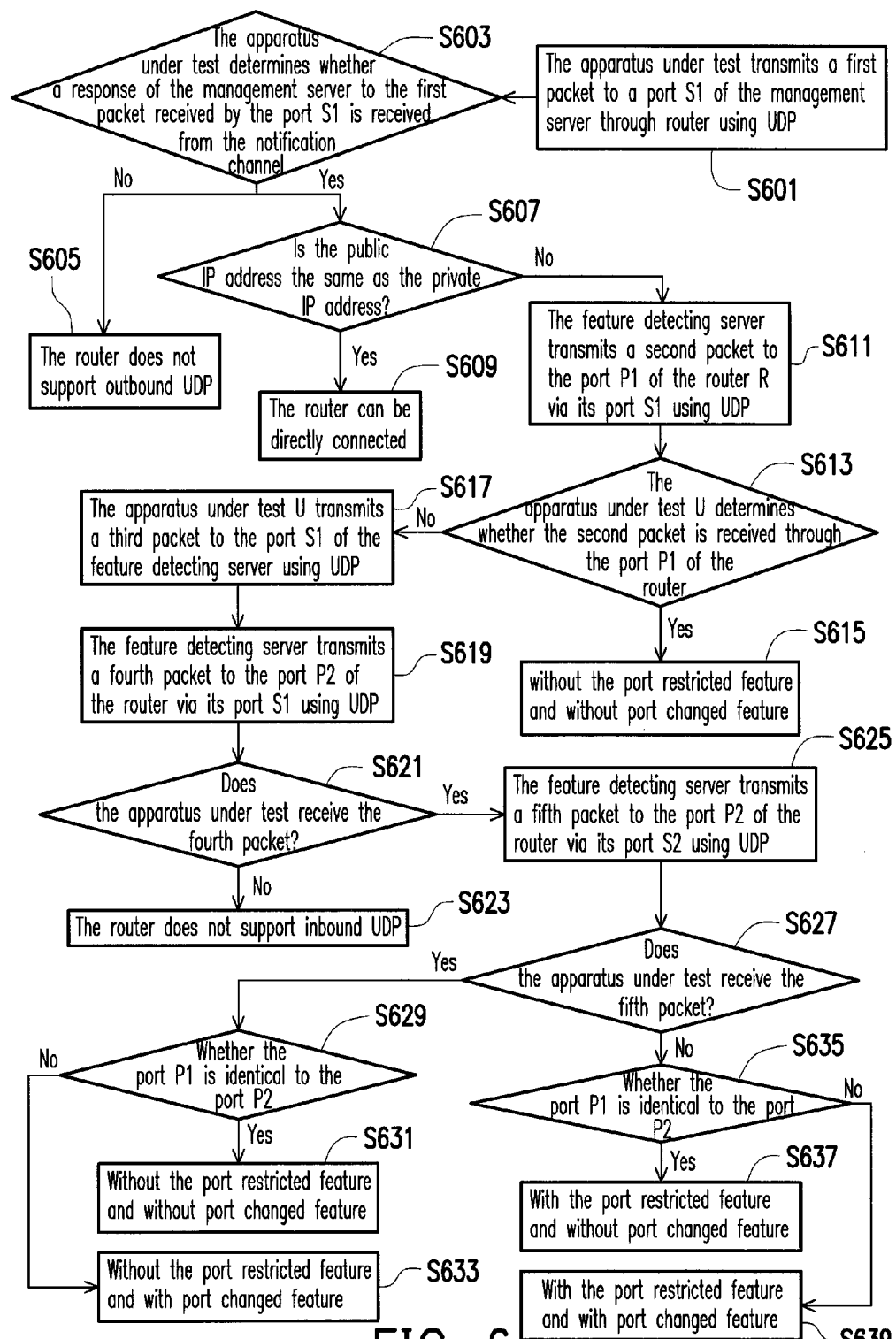
FIG. 6 is a flowchart of determining the feature of a router according to an embodiment of the present disclosure.

For example, FIG. 6 is a flowchart of determining the feature of a router according to an embodiment of the present disclosure. In this embodiment, user datagram protocol (UDP) is considered as an unreliable communication protocol for explanation. Please refer to FIG. 5 and FIG. 6, the apparatus under test U transmits a first packet to a port S1 (first port) of the management server 110 using UDP (step S601).

Afterwards, the apparatus under test U determines whether a response of the management server 110 to the first packet received by the port S1 is received from the notification channel (step S603). If the response of the management server 110 to the first packet received by the port S1 is not received, the apparatus under test U determines that the router R does not support outbound UDP (step S605). If the apparatus under test U receives the response of the management server 110 to the first packet received by the port S1 from the notification channel, the apparatus under test U will compare the private IP address with the public IP address included in the response of the first packet to determine whether the public IP address is the same as the private IP address (step S607). Herein, the response of the first packet includes the public IP address of the router R and the port P1 (second port) of the router R that transmits the first packet. If the public IP address of the network node is the same as the private IP address, then it is determined that the router R can be directly connected (step S609). If the public IP address of the network node is not the same as the private IP address, then the follow-up steps may be performed through the feature detecting server 510.

The feature detecting server 510 transmits a second packet to the port P1 of the router R via its port S1 using UDP (step S611). Afterwards, the apparatus under test U determines whether the second packet is received through the port P1 of the router R (step S613). When the apparatus under test U receives the second packet from the port S1 of the feature detecting server 510 through the port P1 of the router R, the apparatus under test U determines that the corresponding router R does not have the port restricted feature and the port changed feature (step S615).

When the apparatus under test U does not receive the second packet from the port S1 of the feature detecting server 510 through the port P1 of the router R, the apparatus under test U transmits a third packet to the port S1 of the feature detecting server 510 through a port P2 (third port) of the router R using UDP (step S617). The foregoing third packet is applied for requesting the feature detecting server 510 to transmit a fourth packet to the port P2 of the router R that the apparatus under test U is corresponding to. And after the feature detecting server 510 receives the third packet, the fourth packet is transmitted to the port P2 of the router R via its port S1 using UDP (step S619).

Afterwards, the apparatus under test U detects whether the fourth packet is received (step S621). If the apparatus under test U does not receive the fourth packet, then it is determined that the router R does not support inbound UDP. When the apparatus under test U receives the fourth packet through the port P2 of the router R, the apparatus under test U may further notify the feature detecting server 510 to retransmit once via the port S2 (fourth port) of the feature detecting server 510. The feature detecting server 510 transmits a fifth packet to the port P2 of the router R via its port S2 using UDP (step S625). Then, the apparatus under test U detects whether the fifth packet is received from the port S2 of the feature detecting server 510 (step S627).

In the case that the apparatus under test U receives the fifth packet from the port S2 of the feature detecting server 510, whether the port P1 is identical to the port P2 is determined (step S629). If the port P1 is identical to the port P2, it is determined that the corresponding router R does not have the port restricted feature and the port changed feature (step S631). If the port P1 is not identical to the port P2, it is determined that the corresponding router R does not have the port restricted feature and has the port changed feature (step S633).

Furthermore, in the case that the apparatus under test U does not receive the fifth packet from the port S2 of the feature detecting server 510, similar to step S629, whether the port P1 is identical to the port P2 is determined (step S635). If the port P1 is identical to the port P2, it is determined that the corresponding router R has the port restricted feature and does not have the port changed feature (step S637). If the port P1 is not identical to the port P2, it is determined that the corresponding router R has the port restricted feature and the port changed feature (step S639).

The first electronic apparatus 120 and the second electronic apparatus 130 detect the features of the first network 140 and the second network node 150 via the above-mentioned steps S601-S639, and this may improve the logical judgement of the management server 110 and further improve the successful rate of hole punching connection.

Based on the above embodiments, the management server 110 may obtain the session profiles of the first electronic apparatus 120 and the second electronic apparatus 130, when one of the ends (such as the first electronic apparatus 120) sends a connection request to the management server 110, the management server 110 may pass the session profile of the target asked to be connected (such as the second electronic apparatus 130) to the first electronic apparatus 120, and thus determine the data transmission mode. For example, whether a connection type is a datagram is determined. If the connection type is not a datagram, then establish a transmission control protocol (TCP) connection. If the connection type is a datagram and the requirement of data transmission is a reliable communication protocol, then establish a reliable UDP connection. After the connection is established, whether the data transmission needs encryption is determined. If encryption is needed, then an encryption mode is chosen and the connecting condition is reported. Then, data transmission is started and data encryption/decryption is performed according to whether the encryption mode is chosen.

To sum up, the above embodiments provide a network medium mechanism based on the management server for performing a cross combination of multiple connection detection procedures and guiding the order of connection establishment between the two parties. Also, an apparatus end agents is configured in each electronic apparatus and a server end agent module is configured in the management server to establish a real-time and economically beneficial data channel (notification channel). Moreover, each electronic apparatus reports its connection result to the management server for the management server to learn and analyze and thus obtain a connection success/failure record, and accordingly, dynamically adjust which connection detection procedures are to be executed and their examining order. Accordingly, the connectabililty among these electronic apparatuses can be determined by further subtly using the management server, and the optimal traversal method can be found based on the connection success/failure record. In addition, the connection behavior supported by the network where the electronic apparatuses located can be pre-detected, and therefore, the management server can find the optimal connection method during the session period and this improves the real connecting speed dramatically.

It will be apparent to those skilled in the art that various modifications and variations can be made to the structure of the present disclosure without departing from the spirit or scope of the disclosure. In view of the foregoing, it is intended that the present disclosure cover modifications and variations of this disclosure provided they fall within the scope of the following claims and their equivalents.

What is claimed is:
1. A connection method, comprising:
   detecting connection behavior supported by a network where each of a plurality of electronic apparatuses is located through a management server, and accordingly generating a corresponding connection profile for each of the plurality of electronic apparatuses and storing the corresponding connection profiles to the management server;

performing the following steps by the management server when the management server receives a connection request desired to establish a connection with a second electronic apparatus of the electronic apparatuses from a first electronic apparatus of the electronic apparatuses:

reading the corresponding connection profile of the first electronic apparatus and the second electronic apparatus respectively;

dynamically adjusting a plurality of connection detection procedures to be executed based on a connection success/failure record; and examining whether the connection can be established between the first electronic apparatus and the second electronic apparatus through the connection detection procedures according to the corresponding connection profile of the first electronic apparatus and the corresponding connection profile of the second electronic apparatus, so as to generate a session profile for establishing the connection between the first electronic apparatus and the second electronic apparatus.

2. The connection method according to claim 1, wherein each of the electronic apparatuses further performs the following steps:

when connecting to the network where one of the plurality of the electronic apparatuses is located, determining whether it is a first-time connection of the network; and if it is the first-time connection, detecting the connection behavior supported by the network where the one of the plurality of electronic apparatuses is located through the management server.

3. The connection method according to claim 1, wherein when the management server receives the connection request desired to establish the connection with the second electronic apparatus of the electronic apparatuses from the first electronic apparatus of the electronic apparatuses, further comprising:

determining whether the session profile for establishing the connection between the first electronic apparatus and the second electronic apparatus exists by the management server;

if the session profile does not exist, executing the step of dynamically adjusting the connection detection procedures to be executed based on the connection success/failure record by the management server; and if the session profile exists, transmitting the session profile to the first electronic apparatus and the second electronic apparatus by the management server, so as to establish the connection between the first electronic apparatus and the second electronic apparatus.

4. The connection method according to claim 1, wherein the step of detecting the connection behavior supported by the network where each of the electronic apparatuses is located through the management server comprises:

establishing a notification channel with the management server by each of the electronic apparatuses for transmitting a plurality of connection detection messages to the management server through the notification channel;

receiving a plurality of responding messages from the management server by each of the electronic apparatuses, wherein the responding messages are transmitted separately by the management server corresponding to the connection detection messages; and determining the connection behavior of a network node located in the network according to the responding messages, wherein the network node has a function of network address translation.

5. The connection method according to claim 4, wherein the network node is a router; and the connection detection messages comprises at least one or a combination of messages for detecting a type of the network node, messages for detecting a geographical location or an Internet service provider of the network node, messages for detecting whether each of the electronic apparatuses can be connected directly, messages for detecting whether the network node has a capability of port forwarding, messages for detecting whether the network node has a capability of hole punching, messages for detecting whether each of the electronic apparatuses only supports an outbound connection and does not have a support of being connected, and messages for detecting features of the network node.

6. The connection method according to claim 1, wherein the connection detection procedures comprising a direct connection procedure, a port forwarding procedure, a hole punching procedure, and a relay connection procedure; and each of the electronic apparatuses is one of a notebook computer, a desktop computer, a smart phone, a tablet computer, a network attached storage and an Internet protocol camera, which has a function of network communication.

7. The connection method according to claim 1, further comprising:

gathering statistics of every connection for each of the electronic apparatus through the management server, so as to obtain the connection success/failure record of each of the electronic apparatuses.

8. The connection method according to claim 1, wherein an apparatus end agent is configured in each of the plurality of electronic apparatuses, and a server end agent module and a push notification module are configured in the management server, wherein the push notification module is applied such that each of the electronic apparatuses detect the connection behavior supported by the network where one of the plurality of the electronic apparatuses is located through the management server, and each of the electronic apparatuses communicates with the server end agent module of the management server through the apparatus end agent.

9. The connection method according to claim 1, further comprising:

taking one of the electronic apparatuses as an apparatus under test one by one, and detecting features of a network node corresponding to the network where the apparatus under test is located through a feature detecting server in cooperation with the management server by the apparatus under test, comprising:

determining whether a public Internet protocol address of the corresponding network node is the same as a private Internet protocol address through the management server by the apparatus under test; and in the case that the public Internet protocol address of the network node is not the same as the private Internet protocol address, determining whether the corresponding network node has a port restricted feature or a port changed feature through the feature detecting server by the apparatus under test.

10. The connection method according to claim 9, wherein the step of determining whether the public Internet protocol address of the corresponding network node is the same as the private Internet protocol address through the management server bye the apparatus under test comprising:

transmitting a first packet to a first port of the management server via an unreliable communication protocol by the apparatus under test; and comparing the private Internet protocol address with the public Internet protocol address included in a response of the first packet by the apparatus under test to determine whether the public Internet protocol address is the same as the private Internet protocol address when the apparatus under test receives the response of the management server to the first packet received by the first port from a notification channel.

11. The connection method according to claim 10, wherein the step of determining whether the corresponding network node has the port restricted feature or the port changed feature through the feature detecting server by the apparatus under test comprising:

determining that the corresponding network node does not have the port restricted feature and the port changed feature by the apparatus under test when the apparatus under test receives a second packet from the first port of the feature detecting server through a second port of the network node, wherein the second packet is transmitted via the unreliable communication protocol;

transmitting a third packet to the first port of the feature detecting server through a third port of the network node via the unreliable communication protocol by the apparatus under test when the apparatus under test does not receive the second packet through the second port of the network node, wherein the third packet is applied for requesting the feature detecting server to transmit a fourth packet to the third port of the network node that the apparatus under test is corresponding to;

determining whether a fifth packet is received from a fourth port of the feature detecting server by the apparatus under test when the apparatus under test receives the fourth packet through the third port;

in the case that the apparatus under test receives the fifth packet from the fourth port of the feature detecting server, if the second port is identical to the third port, determining that the corresponding network node does not have the port restricted feature and the port changed feature, and if the second port is not identical to the third port, determining that the corresponding network node does not have the port restricted feature and has the port changed feature; and in the case that the apparatus under test does not receive the fifth packet from the fourth port of the feature detecting server, if the second port is identical to the third port, determining that the corresponding network node has the port restricted feature and does not have the port changed feature, and if the second port is not identical to the third port, determining that the corresponding network node has the port restricted feature and the port changed feature.

12. The connection method according to claim 10, wherein the connection detection procedures include a hole punching procedure, wherein the hole punching procedure comprises:

determining a connecting order according to whether respective network nodes of the first electronic apparatus and the second electronic apparatus have the port restricted feature or the port changed feature, wherein when only the network node of one of the first electronic apparatus and the second electronic apparatus has the port changed feature, the connection is performed from the network node having the port changed feature toward the other network node;

when both of the respective network nodes of the first electronic apparatus and the second electronic apparatus have the port changed feature, the connection is performed from the network node without the port restricted feature toward the other network node;

when both of the respective network nodes of the first electronic apparatus and the second electronic apparatus have the port changed feature and the port restricted feature, determining that the first electronic apparatus and the second electronic apparatus cannot perform the hole punching procedure;

when both of the respective network nodes of the first electronic apparatus and the second electronic apparatus do not have the port changed feature, the connection is performed from the network node having the port restricted feature toward the other network node;

when both of the respective network nodes of the first electronic apparatus and the second electronic apparatus do not have the port changed feature and the port restricted feature, the connection is performed from any party of the network nodes toward the other network node.

13. A management server, comprising:

a hardware transmission unit, configured to communicate with a plurality of electronic apparatuses;

a storage device, configured to store connection profiles corresponding to the electronic apparatuses respectively; and a processing unit, coupled to the hardware transmission unit and the storage device, wherein the processing unit receives a plurality of connection detection messages from each of the plurality of electronic apparatuses, and transmits a plurality of corresponding responding messages to each of the electronic apparatuses such that each of the electronic apparatuses determines connection behavior of a network where each of the plurality of the electronic apparatuses is located according to one of the responding messages, and accordingly generates the corresponding connection profile for each of the plurality of the electronic apparatuses and stores the corresponding connection profile for each of the plurality of the electronic apparatuses to the management server;

when the management server receives a connection request desired to establish a connection with a second electronic apparatus of the electronic apparatuses from a first electronic apparatus of the electronic apparatuses, the processing unit reads the corresponding connection profile of the first electronic apparatus and the corresponding connection profile of the second electronic apparatus respectively from the storage device, dynamically adjusts a plurality of connection detection procedures to be executed based on a connection success/failure record, and tests whether the connection can be established between the first electronic apparatus and the second electronic apparatus through the connection detection procedures based on the corresponding connection profile of the first electronic apparatus and the corresponding connection profile of the second electronic apparatus, so as to generate a session profile between the first electronic apparatus and the second electronic apparatus.

14. The management server according to claim 13, wherein when the management server receives the connection request desired to establish the connection with the second electronic apparatus from the first electronic apparatus, the management server determines whether the session profile for establishing the connection between the first electronic apparatus and the second electronic apparatus exists; if the session profile does not exist, the management server executes the step of dynamically adjusting the connection detection procedures to be executed based on the connection success/failure record; if the session profile exists, the management server transmits the session profile to the first electronic apparatus and the second electronic apparatus, so as to establish the connection between the first electronic apparatus and the second electronic apparatus.

15. The management server according to claim 13, wherein the connection detection procedures comprising a direct connection procedure, a port forwarding procedure, a hole punching procedure, and a relay connection procedure; and each of the electronic apparatuses is one of a notebook computer, a desktop computer, a smart phone, a tablet computer, a network attached storage and an Internet protocol camera, which has a function of network communication.

16. The management server according to claim 13, wherein a server end agent module and a push notification module are configured in the management server, and an apparatus end agent is configured in each of the electronic apparatuses, wherein each of the electronic apparatuses establishes a notification channel through the apparatus end agent and the push notification module such that the server end agent module and the apparatus end agent perform communication via the notification channel comprising:

the server end agent module receiving the connection detection messages from the apparatus end agent via the notification channel and transmitting the responding messages corresponding to the connection detection messages to the apparatus end agent, such that the apparatus end agent determines the connection behavior of a network node corresponding to the network where each of the electronic apparatuses is located according to the responding messages.

17. The management server according to claim 16, wherein the respective network nodes corresponding to the first electronic apparatus and the second electronic apparatus have a function of network address translation.

18. The management server according to claim 17, wherein the network node is a router.

19. The management server according to claim 16, wherein the connection detection messages comprises: at least one or a combination of messages for detecting a type of the network node, messages for detecting a geographical location or an Internet service provider of the network node, messages for detecting whether each of the electronic apparatuses can be connected directly, messages for detecting whether the network node has a capability of port forwarding, messages for detecting whether the network node has a capability of hole punching, messages for detecting whether each of the electronic apparatuses only supports an outbound connection and does not have a support of being connected, and messages for detecting features of the network node.

20. The management server according to claim 13, wherein the processing unit gathers statistics of every connection for each of the electronic apparatuses, so as to obtain the connection success/failure record of each of the electronic apparatuses.

* * * * *